(12) United States Patent
Langlois et al.

(10) Patent No.: US 10,252,459 B2
(45) Date of Patent: Apr. 9, 2019

(54) MOLD ELEMENT FOR FORMING A CONTAINER, PROVIDED WITH PRESSURE-RELEASE AIR VENTS IN THE FORM OF SLOTS

(71) Applicant: SIDEL PARTICIPATIONS, Octeville sur Mer (FR)

(72) Inventors: Jean-Christophe Langlois, Octeville sur Mer (FR); Regis Bechen, Octeville sur Mer (FR); Michel Boukobza, Octeville sur Mer (FR); Mickael Letestu, Octeville sur Mer (FR)

(73) Assignee: SIDEL PARTICIPATIONS, Octeville sur Mer (FR)

( * ) Notice: Subject to any disclaimer, the term of this patent is extended or adjusted under 35 U.S.C. 154(b) by 375 days.

(21) Appl. No.: 15/106,185

(22) PCT Filed: Dec. 9, 2014

(86) PCT No.: PCT/FR2014/053231
§ 371 (c)(1),
(2) Date: Jun. 17, 2016

(87) PCT Pub. No.: WO2015/092213
PCT Pub. Date: Jun. 25, 2015

(65) Prior Publication Data
US 2016/0332356 A1    Nov. 17, 2016

(30) Foreign Application Priority Data
Dec. 19, 2013 (FR) ...................... 13 63089

(51) Int. Cl.
*B29C 49/64* (2006.01)
*B29C 49/48* (2006.01)
(Continued)

(52) U.S. Cl.
CPC .......... *B29C 49/4823* (2013.01); *B29C 49/06* (2013.01); *B29C 49/48* (2013.01);
(Continued)

(58) Field of Classification Search
CPC ..... B29C 49/4823; B29C 49/64; B29C 49/48; B29C 2049/4882; B29C 2049/4825; B29C 2049/4828
See application file for complete search history.

(56) References Cited

U.S. PATENT DOCUMENTS 7,134,867 B2    11/2006  Jarman et al.
2007/0026098 A1  2/2007  Lemaistre et al.
(Continued)

FOREIGN PATENT DOCUMENTS

DE  10 2010 032 618 A1   2/2012
FR      2 856 333 A1   12/2004
(Continued)

OTHER PUBLICATIONS

International Search Report, dated Feb. 12, 2015, from corresponding PCT Application.

*Primary Examiner* — Timothy Kennedy
(74) *Attorney, Agent, or Firm* — Young & Thompson

(57) ABSTRACT

A one-piece mold element (3, 7) for a mold (1) for manufacturing containers from blanks of plastic material by blow molding or stretch blow molding. The mold element (3, 7) includes a one-piece molding wall (4, 8) having a raised molding surface (5, 9) bearing the imprint of at least one portion of a container, the molding wall (4, 8) having at least one decompression vent (20) extending therethrough, the hole leading, via an inner opening (21), onto the molding surface (9), which is provided in the form of a slot.

18 Claims, 6 Drawing Sheets

(51) Int. Cl.
*B29C 49/06* (2006.01)
*B29K 667/00* (2006.01)
*B29L 31/00* (2006.01)

(52) U.S. Cl.
CPC ........ *B29C 49/64* (2013.01); *B29C 2049/483* (2013.01); *B29C 2049/4853* (2013.01); *B29C 2049/4882* (2013.01); *B29C 2049/4892* (2013.01); *B29C 2049/4897* (2013.01); *B29K 2667/003* (2013.01); *B29L 2031/7158* (2013.01); *B29L 2031/757* (2013.01)

(56) References Cited

U.S. PATENT DOCUMENTS

| | | |
|---|---|---|
| 2010/0255141 A1 | 10/2010 | Liu |
| 2011/0223275 A1 | 9/2011 | Dagorn et al. |
| 2015/0061196 A1* | 3/2015 | Dachs .................... B29C 49/48 264/523 |

FOREIGN PATENT DOCUMENTS

| | | |
|---|---|---|
| FR | 2 947 755 A1 | 1/2011 |
| JP | H8-267557 A | 10/1996 |
| WO | 00/74925 A1 | 12/2000 |
| WO | 2005/002820 A1 | 1/2005 |
| WO | 2008/000938 A2 | 1/2008 |

* cited by examiner

MOLD ELEMENT FOR FORMING A CONTAINER, PROVIDED WITH PRESSURE-RELEASE AIR VENTS IN THE FORM OF SLOTS

The invention relates to the forming of containers from parisons made of plastic material by blow molding or stretch blow molding in a mold bearing the imprint of a model of the container to be formed. The term "parison" refers to not only a preform (ordinarily obtained by injection), but also an intermediate container that has undergone a preliminary blow molding operation starting from a preform.

A mold usually comprises multiple one-piece elements, each having a molding surface bearing the imprint of at least a portion of the container. Thus, a mold that is designed for forming containers comprises a side wall bearing the imprint of a body and a shoulder of the container, generally divided into two mutually articulated half-molds for making it possible to insert a parison into the mold and a mold bottom bearing the imprint of a bottom of the container, with this mold bottom being positioned in an opening made between the half-molds opposite the shoulder. For some containers having particular local shapes (for example protrusions or recessed reserved places forming a handle), the mold can comprise movable inserts bearing the imprints of these shapes.

A mold element is generally penetrated by one or multiple pressure-release air vents that make it possible to evacuate the air trapped between the material of the preform during forming and the wall of the mold.

Such pressure-release air vents are provided in particular in the mold bottom and more specifically in the zones reached at the end by the material. The international application WO 00/74925 (KRUPP) illustrates a mold bottom designed with a petal-shaped bottom: this bottom is equipped with pressure-release air vents formed by perforations made in recessed reserved places of the mold bottom corresponding to the feet of the container.

Such a structure is not without its drawbacks. Actually, the size (i.e., the diameter) of the air vents has to be limited to keep the material from flowing into the air vents during the forming and the subsequent appearance of projecting points of material on the surface of the formed container. The result is a limitation of the flow of air evacuated through the air vents, which slows down the forming and can interfere with a good imprint-taking because of quick cooling (and therefore stiffening) of the material before it has been able to completely conform to the raised patterns formed on the wall of the mold.

A possible solution for eliminating this obstacle is to multiply the air vents by piercing a multitude of holes. This solution makes it possible to increase the flow of air evacuated during the forming, but it multiplies the machining operations and, for the complex surfaces (in particular those of the mold bottoms designed with petal-shaped bottoms), makes it necessary to resort to multi-shaft machining machines that are complex to program.

Furthermore, a mold bottom that consists of two parts that can be engaged by means of corresponding cutouts and raised patterns is known from the French patent FR 2 947 755 (COMEP). Air vents are made on the edge of one of the two parts. Such a solution, however, has the drawback that it is necessary to produce two parts, with tight manufacturing tolerances for making possible an assembly that is adjusted with zero play (unless it is accepted that the container that is obtained will have flaws, and in particular folds of material corresponding to the interface between the two parts of the mold bottom).

A first objective is to propose a one-piece mold element that is equipped with air vents for the evacuation of air during forming, making it possible to increase the air flow.

A second objective is to propose a one-piece mold element that can be manufactured relatively easily.

A third objective is to propose a mold element that is equipped with air vents whose shape, arrangement and/or dimensions do not create a gap on the outer surface of the container.

To fulfill at least one of these objectives, in the first place, a one-piece mold element designed for a mold for the manufacturing of containers by blow molding or stretch blow molding from parisons made of plastic material is proposed, with this mold element comprising a one-piece molding wall that has a raised molding surface bearing the imprint of at least a portion of a container, with the molding wall being penetrated by at least one pressure-release air vent that empties, via an inner opening, onto the molding surface, with this opening being in the form of a slot.

Thanks to this arrangement, the air vent offers an increased passage cross-section that makes it possible to increase the flow of air during the forming. The result is a better blow-moldability of the container (i.e., a better capacity of the container to bear the imprint of the mold).

Various additional characteristics can be provided, by themselves or in combination:

- The or each air vent has a length and a width such that the length is greater than twice the width;
- At least one air vent has an opening that extends along a curvilinear profile;
- At least one air vent has an opening that extends along a straight profile;
- At least one air vent flares out from its inner opening toward an outer opening on an outer surface of the mold element;
- The mold element comprises a series of air vents that extend in an essentially parallel manner;
- The molding surface bears the imprint of a petal-shaped bottom of the container and comprises alternating ribs bearing the imprints of valleys of the petal-shaped bottom, which radiate from a central zone, and recessed reserved places bearing the imprints of feet of the petal-shaped bottom, which extend between the ribs, and the mold element has at least one air vent made in the recessed reserved places;
- The or each air vent extends in a radial manner;
- The mold element comprises a series of air vents that extend radially into the recessed reserved places;
- The mold element comprises, in each recessed reserved place, three air vents, namely a median air vent that extends along a median line of the reserved place, framed by a pair of lateral air vents that extend essentially at the junction between the recessed reserved place and the adjacent ribs;
- The mold element comprises a groove that is hollowed out in the molding surface and that links the air vents;
- The mold element comprises a secondary wall that defines, with the molding wall, a cavity that conforms to the raised pattern of the molding surface for the circulation of a coolant, and in that the or each air vent extends through the cavity by being separated from the latter by a wall with a closed contour connecting the molding wall to the secondary wall.

In the second place, a mold for manufacturing containers from parisons made of plastic material is proposed, which mold comprises at least one mold element as presented above.

Other objects and advantages of the invention will become evident from the description of an embodiment, given below with reference to the accompanying drawings, in which:

FIG. 1 shows a mold 1 for the forming of a container from a parison 2 made of plastic material by blow molding or stretch blow molding.

Figure 1:
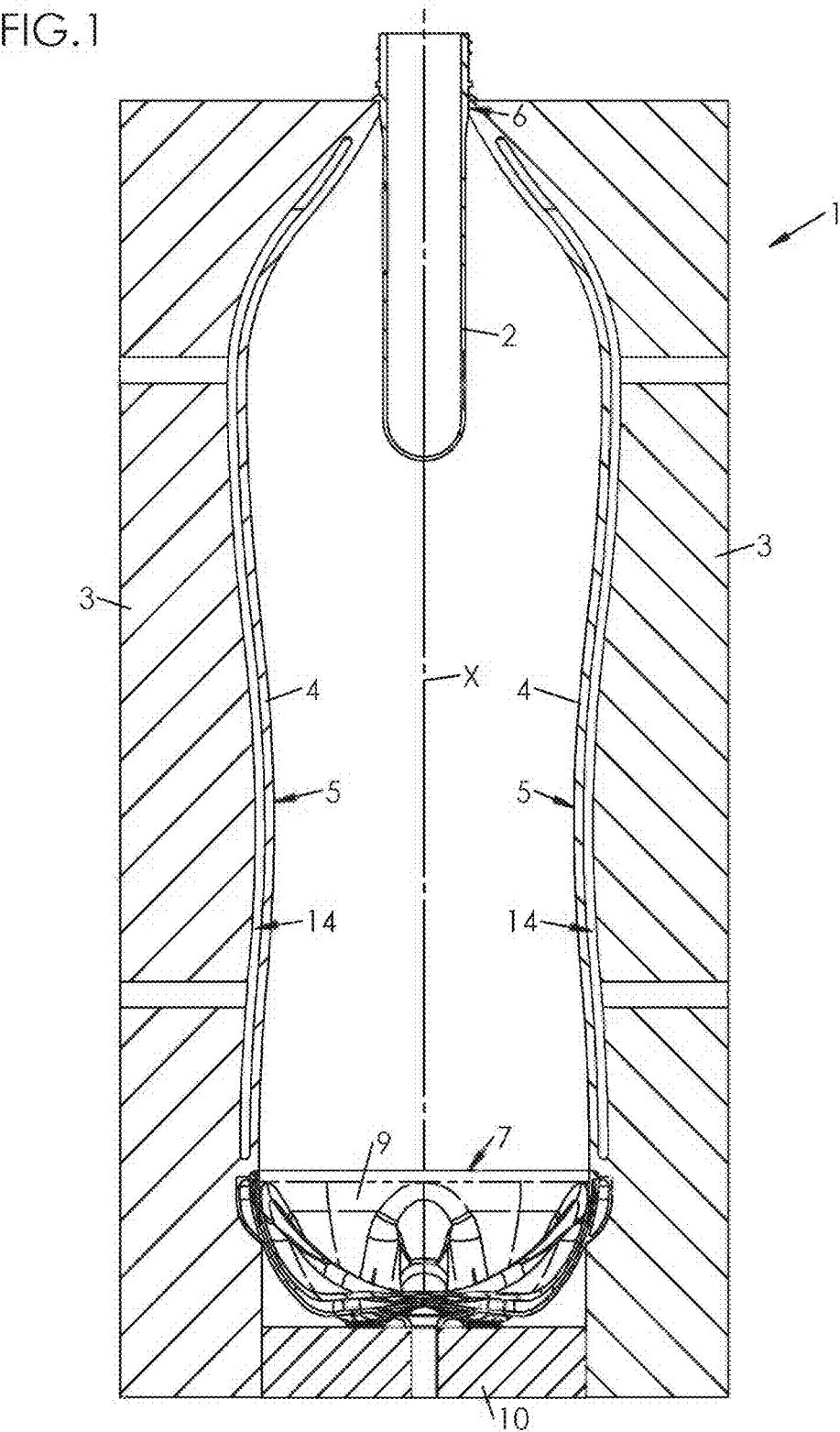
FIG. 1 is a perspective view of a mold for the forming of containers with petal-shaped bottoms, which mold comprises two articulated half-molds and a mold bottom.

The parison 2 can be an intermediate container that has undergone a first blow molding operation starting from a preform. It can also be, as in the illustrated example, a preform obtained by injection of a plastic material such as PET.

The mold 1 encloses multiple one-piece elements preferably made in a metal material, for example steel or aluminum, optionally alloyed to increase their mechanical performances and/or resistance to corrosion.

Thus, in the illustrated example, the mold encloses two half-molds 3 that are mutually articulated around a vertical X axis for allowing the insertion of the parison 2 (as described in, for example, the French patent application FR 2 856 333 or in the corresponding international application WO 05/002820), and each having a molding wall 4 defining a raised molding surface 5, bearing the imprint of a body of the container that is to be formed.

The two half-molds 3 define, at an upper end, an opening 6 through which the preform 2 extends during the forming of the container. With the two half-molds 3 being identical, the same numerical references are used interchangeably for each hereinafter.

The mold 1 also encloses a one-piece mold bottom 7 comprising a molding wall 8 that defines a raised molding surface 9 bearing the imprint of a bottom of the container. As illustrated, the mold bottom 7 can be mounted on a mold bottom support 10, called a stand. The stand 10 is movable in translation in an axial direction merged with the central X axis.

The stand 10 is only roughly shown in FIG. 1. By way of a nonlimiting embodiment of such a stand, reference can be made to the international application WO 2008/000938 (Sidel).

Figure 2:
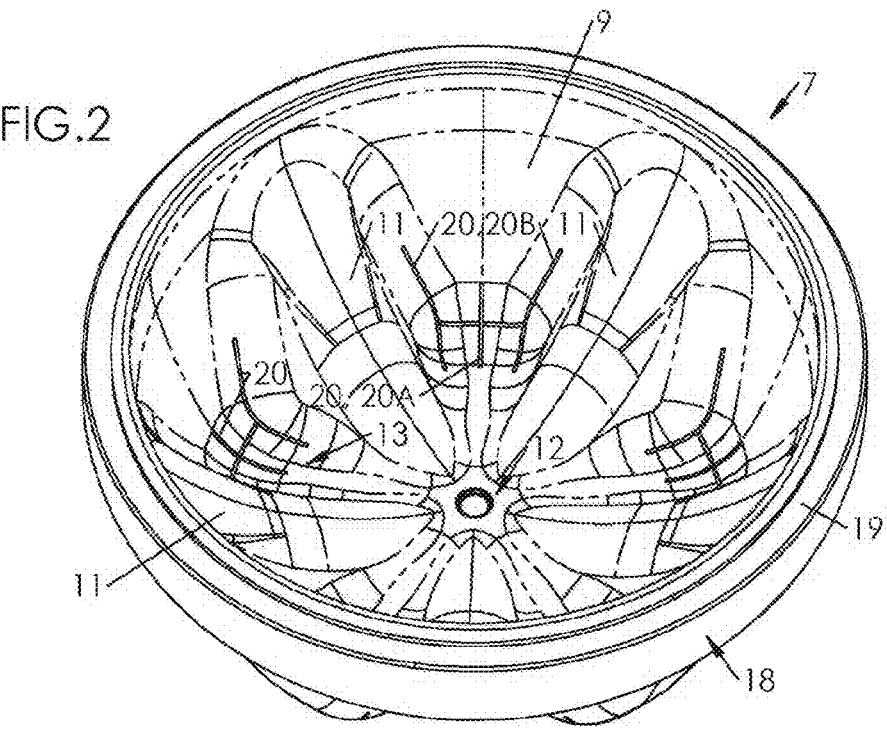
FIG. 2 is a perspective view of the mold bottom.
Figure 3:
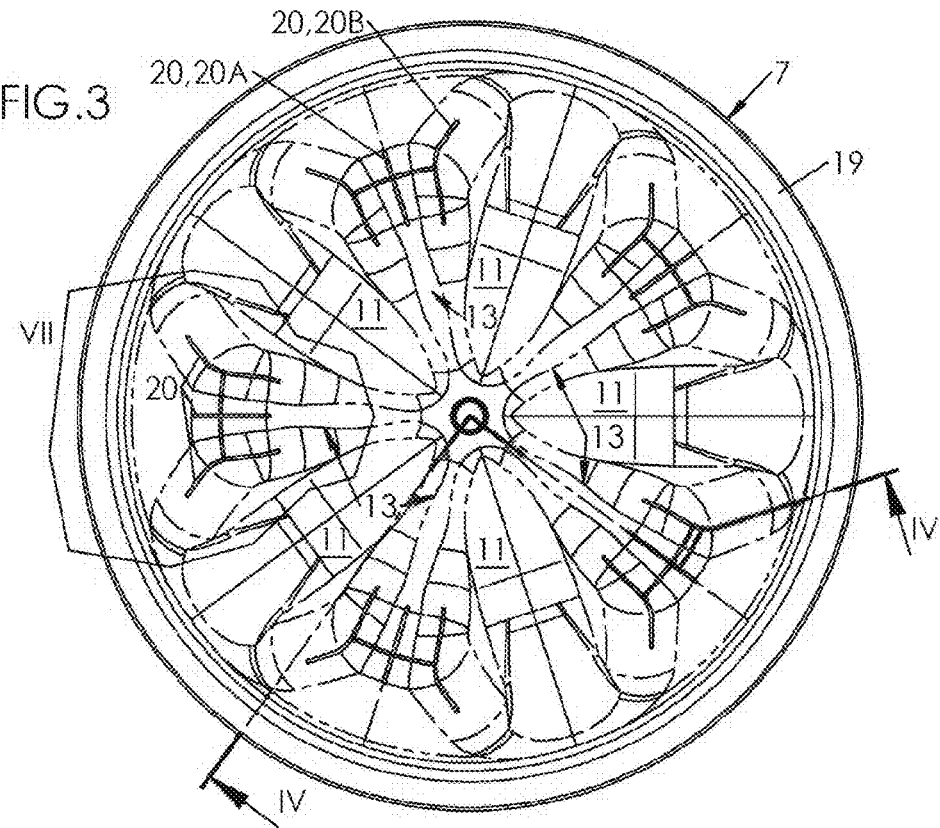
FIG. 3 is a top view of the mold bottom.
Figure 4:
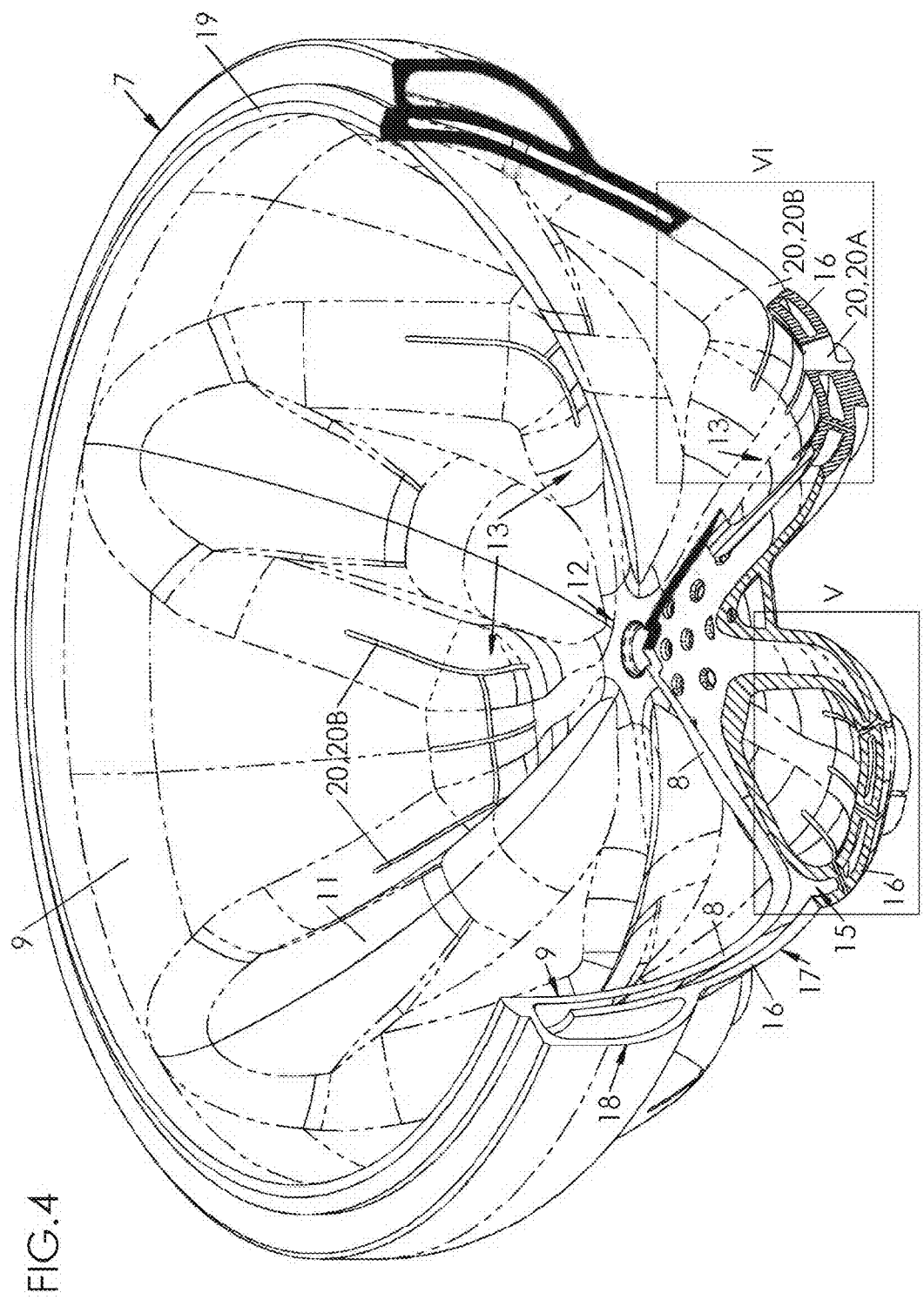
FIG. 4 is a partial perspective cutaway and detached view of the element of FIG. 3, along the cutting line IV-IV, with this cutaway not totally passing through; the material cut out vertically and radially appears in black; the material cut out horizontally has cross-hatching; the material cut out transversely has a checkered pattern.

In this case, the container to be formed has a petal-shaped bottom, which FIGS. 2, 3 and 4 clearly show. It is actually seen that the molding surface 9 of the mold bottom 7 is embossed and has, when examined in revolution around the central X axis of the mold, alternating ribs 11 (bearing the imprints of valleys on the petal-shaped bottom) that radiate from a central zone 12 that is adjacent to the X axis, and recessed reserved places 13 (bearing the imprints of feet on the petal-shaped bottom) that extend between the ribs 11. In the illustrated example, the number of ribs 11 (identical to the number of recessed reserved places 13) is five, but this number, purely illustrative, could be different.

Each mold element can comprise, as in the illustrated example, a cavity 14, 15 enclosed in the mold element 3, 7, in which a coolant circulates during the forming of the container to ensure the heat exchange with the latter.

This cavity 14, 15 is entirely delimited here by the material of the mold element 3, 7, without being, even partially, delimited by a connected part.

FIG. 1 shows such a cavity 14 that is formed in each of the half-molds 3. This cavity 14 essentially conforms to the raised pattern of the molding surface 5 bearing the imprint of the body of the container, which makes possible a relatively homogeneous heat exchange over the entire body. Furthermore, it is seen in FIG. 1 that the molding wall 4 is relatively thin (and with an essentially uniform thickness, which is not a requirement), which enhances cooling (or heating) efficiency.

FIG. 4 shows the mold bottom 7 to illustrate in more detail the structure of its cavity 15. Thus, as is shown in FIG. 4, the cavity 15 essentially conforms to the raised pattern of the molding surface 9. It is seen that, in the embodiment shown, the molding wall 8 is thin in relation to general dimensions (in particular diameter and height) of the mold bottom 7. More specifically, according to a particular embodiment, the thickness of the molding wall 8 (measured perpendicular to any plane that is perpendicular to the molding surface 9) is between approximately 0.5 mm and 5 mm, preferably between 1 mm and 3 mm, and, for example, on the order of 1 mm in the illustrated example. This thickness makes it possible to maximize the heat exchanges while minimizing the quantity of material required for the manufacturing of the mold bottom 7.

Figure 5:
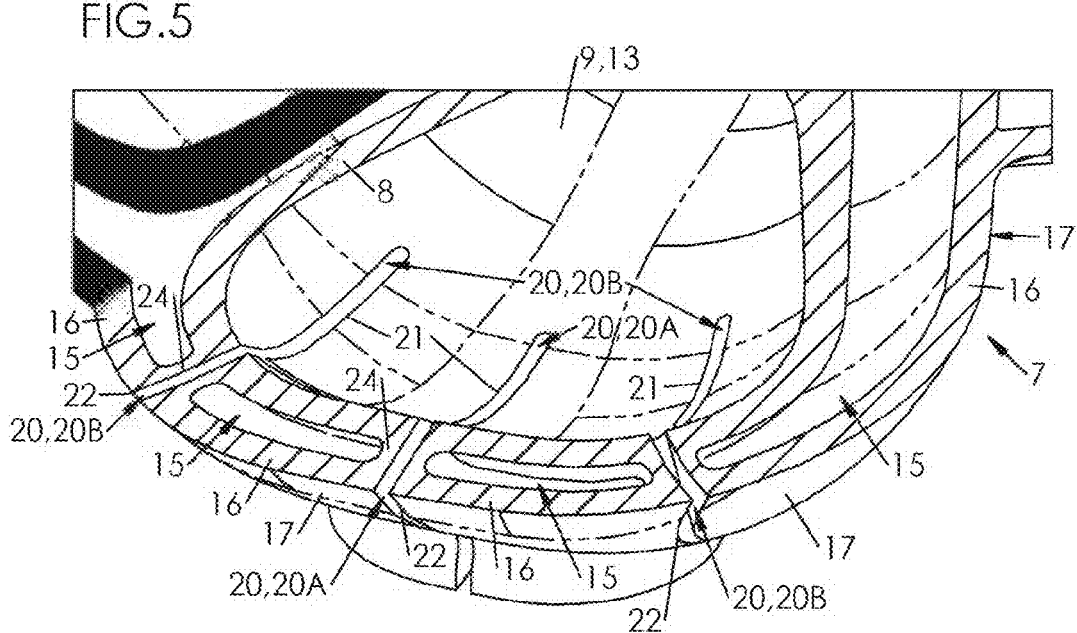
FIG. 5 is a detail view of the mold bottom element of the preceding figures, according to the inset V of FIG. 4.

This thickness can be essentially constant, as in the example illustrated in FIG. 4 or 5, where the apparent thickness variations result from the cutting plane not coinciding, in certain places, with the perpendicular line to the molding surface 9 and therefore obliquely cutting the molding wall 8 into sections, in particular on the sides of the ribs 11 corresponding to the valleys of the container (on the left in FIG. 5).

As shown in FIGS. 4 and 5, the mold bottom 7, made from a single piece, has a secondary wall 16 that delimits the cavity 15 opposite the molding wall. The molding wall 8 and the secondary wall 16 thus form two superposed layers that essentially conform to the raised pattern of the molding surface 9 and jointly delimit the cavity 15. As shown particularly in FIG. 8, the secondary wall 16 has an outer surface 17 turned to face the molding surface 9. This outer surface 17 forms a casing that delimits the mold bottom 7 on the outside.

The fluid enters into the cavity through an intake opening emptying into the latter; it exits from it via a discharge opening that opens from the cavity 15 either directly into a drain pipe or, preferably, into a peripheral collector 18 that encircles the secondary wall 16 by the outside, in the vicinity of an upper peripheral edge 19 of the mold bottom 7.

As shown furthermore in FIGS. 2 to 8, the mold is equipped with pressure-release air vents 20 that make it possible, when the container is formed, to evacuate the air that is trapped between the latter and the molding surface 9. In the illustrated example, these air vents 20 are formed in the mold bottom 7. As a variant, or in combination, such air vents could be formed in each half-mold 3.

As FIGS. 5 to 8 clearly show, each air vent 20 empties through an inner opening 21 onto the molding surface 9 and through an outer opening 22 onto the outer surface 17.

The inner opening 21 comes in the form of a slot, i.e., it has, in the manner of an arrow slit, a large dimension or length L (which can be measured in a rectilinear or curvilinear manner, according to the profile of the inner opening 21 and by following the raised pattern of the molding surface 9), and a small dimension or width W, such that the length L is greater than the width W.

The width W of the air vent 20 is preferably less than or equal to 0.5 mm, so as to keep the material from penetrating into the air vent 20 during the forming of the container, which would allow gaps on the outer surface of the latter. The width W is even advantageously less than or equal to 0.4, and even 0.3 mm, which corresponds approximately to the thickness of material of the container that is formed. This width W is not necessarily constant along the inner opening 21. In particular, the inner opening 21 can have zones locally that are narrowed in width, depending on the desired flow of air. By contrast, any length L is possible.

In particular, the length L of the inner opening 21 can be greater than or equal to twice the width W, which makes it possible at least to double the flow of air in relation to a single hole with a circular cross-section of diameter W.

According to a preferred embodiment illustrated in the figures, the flow rate can, however, be considerably increased by producing one (or multiple) air vent(s) 20 whose inner opening 21 has a length L that is much greater (i.e., in a ratio at least equal to 10) than the width W.

Thus, it is possible to provide an air vent 20 whose width W of the inner opening 21 is approximately 0.5 mm, while the length L is between 10 mm and 20 mm. The result, in relation to a single hole with a circular cross-section of diameter W, is a multiplication of the passage cross-section of the air vent 20 (and therefore of the flow of air) by a factor of between 20 and 100, enhancing the blow-moldability of the container.

In the mold bottom 7 illustrated in FIGS. 2 to 8, designed with a petal-shaped container bottom, it is advantageous to form the air vent 20 in the (or in each) recessed reserved place 13.

The profile of the inner opening 21 is not necessarily rectilinear: this profile can actually be curvilinear and in particular can snake around (or inside) raised zones of the molding surface 9.

Furthermore, so as to also increase the air flow, multiple air vents 20 can be formed, which extend, for example, in an essentially parallel manner.

Thus, in the example illustrated in FIGS. 2 to 8, the mold bottom 7 comprises a series of air vents 20 (in this case three in number) that extend radially into the recessed reserved places 13. More specifically, as is readily seen in FIG. 7, the mold bottom 7 comprises, in each recessed reserved place 13, three air vents 20, namely a median air vent 20A that extends along a median line of the reserved place 13, framed by a pair of lateral air vents 20B that extend essentially at the junction between the recessed reserved place 13 and the adjacent ribs 11. The median air vent 20A is, for example, essentially rectilinear (when seen along the X axis of the mold 1), while the lateral air vents 20B offer, when seen along the X axis of the mold 1, a curved profile that follows the junction between the recessed reserved place 13 and the adjacent ribs 11.

In the example illustrated in FIGS. 2 to 7, the lateral air vents 20B have a length that is greater than that of the median air vent 20A, so as to make it possible for the material to correctly conform to the junction between the recessed reserved place 13 and the adjacent ribs 11 at a distance from the X axis of the mold 1.

The radial arrangement of the air vents 20 makes it possible to maintain a high air flow and to reduce the latter not in jerks but rather in a continuous manner during forming, to the extent that the blow-molded material unwinds radially from the center of the mold bottom 7 toward its periphery. This arrangement therefore makes it possible to increase the blow-moldability of the container again.

To distribute the air in a relatively uniform manner between the air vents 20, the latter can be connected via a shallow (in particular less than or equal to 1 mm) hollowed-out groove 23 that is in the molding surface 9 and that links the adjacent air vents 20. In the illustrated example, this groove 23 is in the form of a trough (i.e., with a U-shaped cross-section) and extends in an essentially perpendicular manner to the air vents 20.

Figure 6:
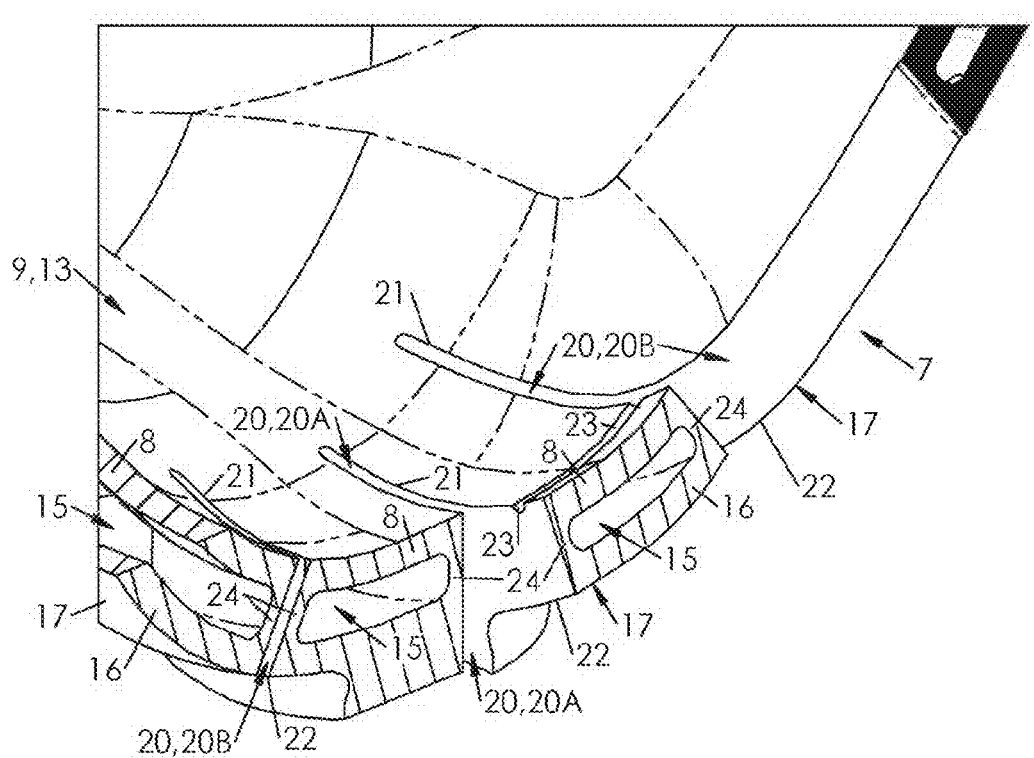
FIG. 6 is a detail view of the mold bottom element of the preceding figures, according to the inset VI of FIG. 4.
Figure 7:
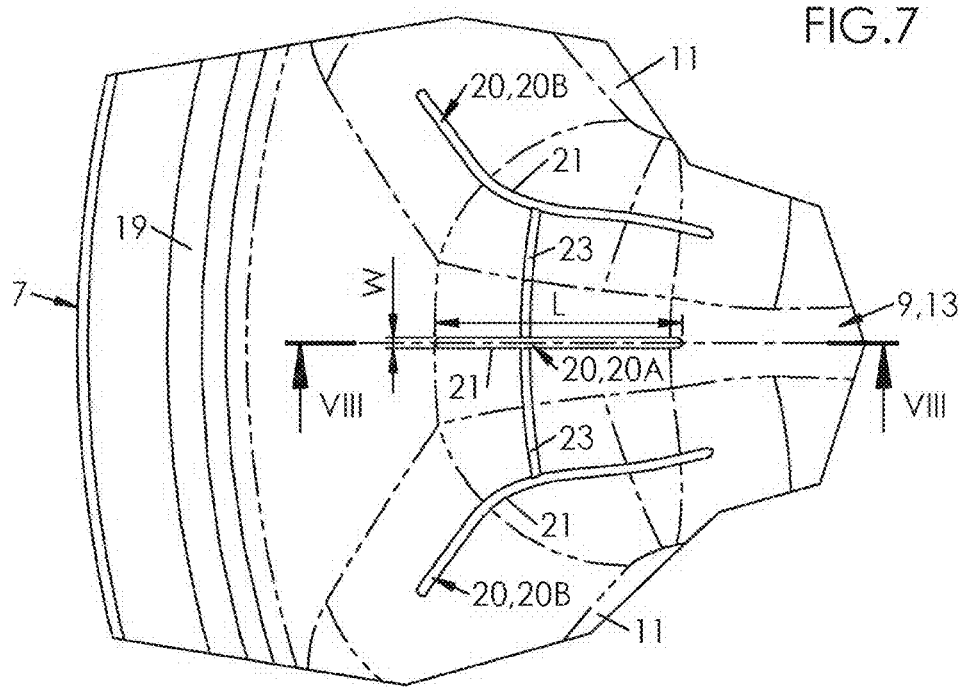
FIG. 7 is a detail view of the mold bottom of FIG. 3, according to the inset VII.
Figure 8:
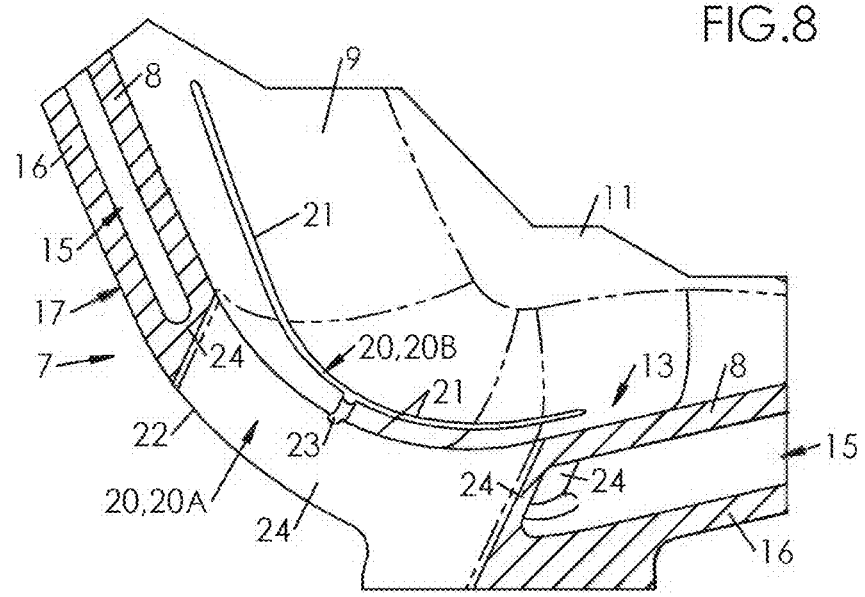
FIG. 8 is a detail cutaway view of the mold bottom of FIG. 7, along the cutting plane VIII-VIII.

As FIGS. 5, 6 and 8 clearly show, in the embodiment where the mold bottom 7 is hollowed out from a cavity 15, each air vent 20 extends through, jointly, the molding wall 8 and the secondary wall 16. In other words, the air vent 20 also extends through the cavity 15, without, however, emptying thereinto. The air vent 20 is actually separated from the cavity 15 by a wall 24 with a closed contour (in this case with an oval contour), which connects the molding wall 8 to the secondary wall 16. The primary function of this wall 24 is to ensure the sealing of the cavity 15 opposite the air vent 20 (and vice versa) and its secondary function is to stiffen the structure of the mold bottom 7 by forming a column of material between the molding wall 8 and the secondary wall 16.

Figure 9:
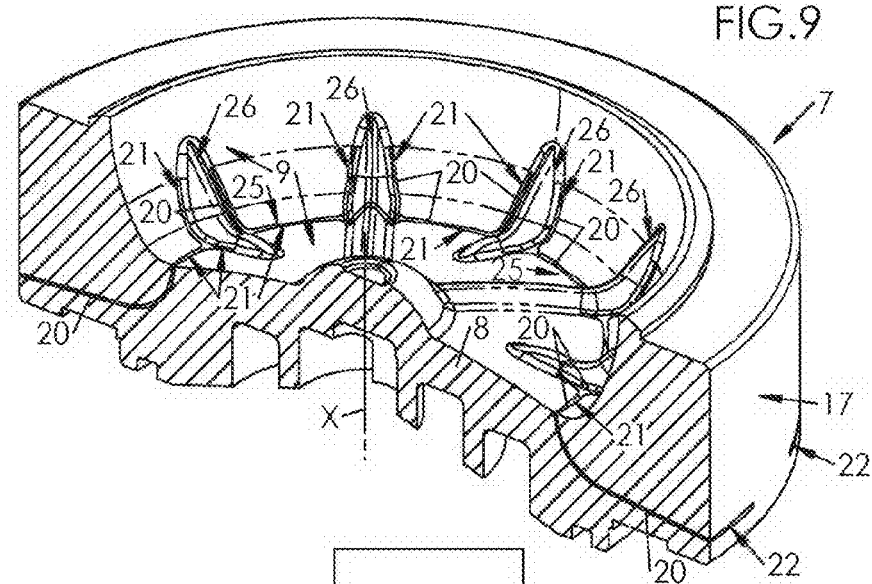
FIG. 9 is a perspective cutaway view of a mold bottom according to a variant embodiment.

FIG. 9 shows a mold bottom 7 according to a variant embodiment, which corresponds to a container bottom of the type designed for plain water.

In this bottom 7, the openings 21 of the air vents 20 extend along a peripheral groove 25, at a junction between a central zone of the bottom 7 corresponding to an arch of the bottom of the container, and a peripheral zone corresponding, in the container, to a junction between the arch and a lower cross-section of the body.

As can be seen in FIG. 9, the air vents 20 rise along raised patterns 26 corresponding to stiffening grooves in the container. The embodiment of FIG. 9 illustrates the fact that the air vents 20 can, in the depth of the mold element 3, 7, extend in any manner according to the constraints imposed by the shape of the element 3, 7. In the example of FIG. 9 in particular, it is seen that the air vents 20 are hollowed out in the material of the mold bottom 7 in such a way that even if at least one portion of the inner openings 21 extends over a surface that is essentially perpendicular to the X axis, the outer openings 22 by contrast open onto a cylindrical outer surface 17 of the bottom 7, parallel to the X axis. Actually, it is seen that the air vents 20 are hollowed out in the manner of a curved layer, with concavity turned (here) toward the outside of the bottom 7.

Figure 10:
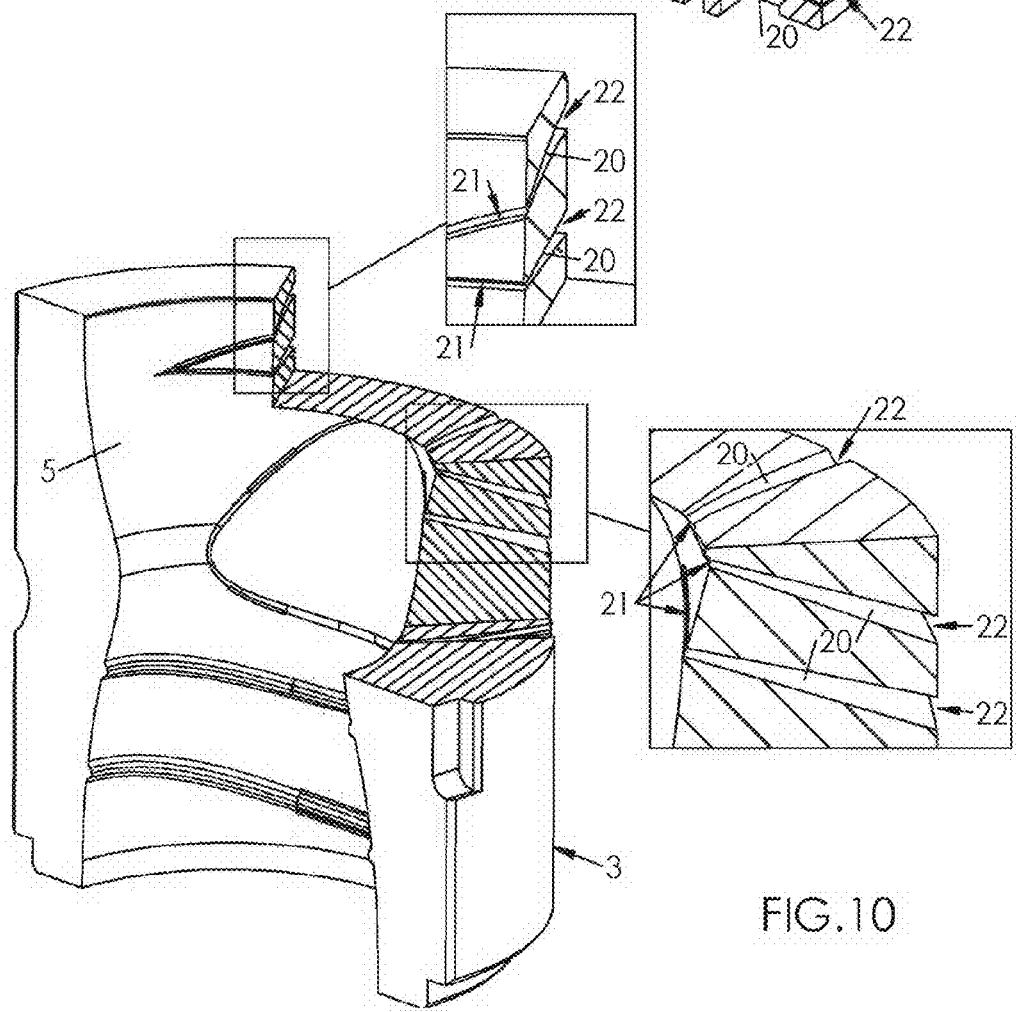
FIG. 10 is a perspective detached view of a half-mold according to a variant embodiment.

FIG. 10 shows a half-mold whose wall 4 is hollowed out by air vents 20 that have the special feature of flaring out from their inner opening 21 in the molding surface 5 toward their outer opening 22 on the outer surface 17, or else toward a collector located in the body of the mold element. This configuration promotes good evacuation of air and illustrates the fact that the passage cross-section of the air vents 20 is not necessarily constant. Such a flaring could be readily applied to the embodiments described above in FIGS. 2 to 9.

FIG. 10 also illustrates that the air vents 20 can be made at any useful location, in particular along lines where the curvature undergoes major variations, typically around raised zones (recessed or projecting) corresponding to imprints formed on the container (projecting or, respectively, recessed).

The manufacturing of the mold element 3, 7 with its air vents 20 and, if necessary, its enclosed cavity 15 can be carried out by direct manufacturing, preferably by the so-called direct additive laser construction technique, translation of the English terminology Direct Metal Laser Sintering (DMLS), which consists, by using a three-dimensional model of the element, in depositing successive layers of a metal powder and in carrying out, after each deposition, a local fusion of the powder by means of a power laser pointing toward the zones intended to form the material of the element to be manufactured. After the last pass, the thus manufactured element (or a parison of the latter) is extracted, while the residual (non-molten) powder is recovered for the purpose of subsequent reuse. The direct additive laser construction can be implemented within a machine such as the one marketed under the trade name EOSINT M 280 by the Electro Optical Systems Company.

This technique makes it possible in particular to produce the mold bottom 7 described above, with the cavity 15 totally enclosed in the material of the bottom 7 and conforming to the raised pattern of the molding surface 9, and the air vents 20 that extend jointly through the molding wall 8, the secondary wall 16, and the cavity 15, which cannot be done using ordinary manufacturing techniques by removing material, in particular by turning or milling.

The direct manufacturing technique makes it possible to simplify and to accelerate the manufacturing of the mold elements 3, 7 by limiting the number of machines and machining operations. In practice, the complete manufacturing of the mold element 3, 7 comprises two successive operations: a first operation for direct manufacturing of a parison of the element 3, 7, and then a second operation for polishing the molding surface 5, 9 of the parison to obtain the final mold element 3, 7.

The material used for the manufacturing of the mold element 3, 7 is preferably metal; it may be in particular steel or aluminum (optionally an alloy thereof). In the case where the fluid circulating in the mold element 3, 7 is water, it is preferable that the material used for its manufacture be corrosion-resistant. Stainless steel will therefore advantageously be used, of which certain powder grades are available that are intended for direct additive laser construction (for example martensitic stainless steel referenced, as the European standard, under the numerical designation 1,4542 or under the symbolic designation X5CrNiCuNb16-4). Aluminum alloyed with silicon and with magnesium may also be suitable: by way of example, the alloy AlSi10Mg is available in powder form intended for direct additive laser construction.

The pressure-release air vents 20 have been described in a detailed manner in the mold bottom 7. However, as we have seen, such air vents could also be formed, in the same manner, in each of the half-molds 3. In the configuration illustrated in FIG. 1, where each half-mold 3 is equipped with a cavity 14 enclosed in the material, the air vents 20 that are made will be transposed to the half-mold 3 as described above for the mold bottom 7 (also provided with such a cavity 15).

The invention claimed is:

1. One-piece mold element (3, 7) designed for a mold (1) for the manufacturing of containers by blow molding or stretch blow molding from parisons made of plastic material, with this mold element (3, 7) comprising a one-piece molding wall (4, 8) that has a raised molding surface (5, 9) bearing the imprint of at least a portion of a container, with the molding wall (4, 8) being penetrated by at least one pressure-release air vent (20) that empties, via an inner opening (21), onto the molding surface (9), wherein the opening (21) comes in the form of a slot, and further comprising a secondary wall (16) that defines, with the molding wall (8), a cavity (15) that conforms to the raised pattern of the molding surface (9) for the circulation of a coolant, and wherein the at least one air vent (20) extends through the cavity (15) by being separated from the latter by a wall (24) with a closed contour connecting the molding wall (8) to the secondary wall (16).

2. Mold element (3, 7) according to claim 1, wherein the inner opening (21) has a length (L) and a width (W) such that the length (L) is greater than twice the width (W).

3. Mold element (3, 7) according to claim 1, wherein at least one air vent (20) has an inner opening (21) that extends along a curvilinear profile.

4. Mold element (3, 7) according to claim 1, wherein at least one air vent (20) has an inner opening (21) that extends along a straight profile.

5. Mold element (3, 7) according to claim 1, wherein at least one air vent (20) flares out from its inner opening (21).

6. Mold element (3, 7) according to claim 1, further comprising a series of air vents (20) that extend in an essentially parallel manner.

7. Mold element (3, 7) according to claim 1, wherein the molding surface (9) bears the imprint of a petal-shaped bottom of the container and comprises alternating ribs (11) bearing the imprints of valleys of the petal-shaped bottom, which radiate from a central zone (12), and recessed reserved places (13) bearing the imprints of feet of the petal-shaped bottom, which extend between the ribs (11), and wherein the mold element (3, 7) has at least one air vent (20) made in the recessed reserved places (13).

8. Mold element (3, 7) according to claim 7, wherein the at least one air vent (20) extends in a radial manner.

9. Mold element (3, 7) according to claim 8, further comprising a series of air vents (20) that extend radially into the recessed reserved places (13).

10. Mold element (3, 7) according to claim 9, further comprising, in each recessed reserved place (13), three air vents (20), namely a median air vent (20A) that extends along a median line of the reserved place (13), framed by a pair of lateral air vents (20B) that extend essentially at the junction between the recessed reserved place (13) and the adjacent ribs (11).

11. Mold element (3, 7) according to claim 9 further comprising a groove (23) that is hollowed out in the molding surface (9) and that links the air vents (20A, 20B).

12. Mold (1) for manufacturing containers from parisons made of plastic material, which comprises at least one mold element (3, 7) according to claim 1.

13. Mold element (3, 7) according to claim 2, wherein at least one air vent (20) has an inner opening (21) that extends along a curvilinear profile.

14. Mold element (3, 7) according to claim 2, wherein at least one air vent (20) has an inner opening (21) that extends along a straight profile.

15. Mold element (3, 7) according to claim 2, wherein at least one air vent (20) flares out from its inner opening (21).

16. Mold element (3, 7) according to claim 2, further comprising a series of air vents (20) that extend in an essentially parallel manner.

17. Mold element (3, 7) according to claim 2, wherein the molding surface (9) bears the imprint of a petal-shaped bottom of the container and comprises alternating ribs (11) bearing the imprints of valleys of the petal-shaped bottom, which radiate from a central zone (12), and recessed reserved places (13) bearing the imprints of feet of the petal-shaped bottom, which extend between the ribs (11), and wherein the mold element (3, 7) has at least one air vent (20) made in the recessed reserved places (13).

18. Mold element (3, 7) according to claim 10 further comprising a groove (23) that is hollowed out in the molding surface (9) and that links the air vents (20A, 20B).

\* \* \* \* \*